US 12,400,679 B1

United States Patent
Fujii et al.

(10) Patent No.: US 12,400,679 B1
(45) Date of Patent: Aug. 26, 2025

(54) THERMALLY ASSISTED MAGNETIC HEAD, HEAD GIMBAL ASSEMBLY, AND HARD DISK DRIVE

(71) Applicant: SAE Magnetics (H.K.) Ltd., Hong Kong (CN)

(72) Inventors: Ryuji Fujii, Hong Kong (CN); Seiichi Takayama, Hong Kong (CN); Yasutoshi Fujita, Hong Kong (CN); Ka Yip Wong, Hong Kong (CN); Taku Kosuge, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 18/790,215

(22) Filed: Jul. 31, 2024

(30) Foreign Application Priority Data

Feb. 27, 2024 (CN) .......................... 202410216890.3

(51) Int. Cl.
*G11B 5/60* (2006.01)
*G11B 5/00* (2006.01)

(52) U.S. Cl.
CPC .... *G11B 5/6088* (2013.01); *G11B 2005/0021* (2013.01)

(58) Field of Classification Search
None
See application file for complete search history.

(56) References Cited

U.S. PATENT DOCUMENTS

| 6,404,706 | B1 * | 6/2002 | Stovall ..................... G11B 5/00 |
| 7,898,909 | B2 | 3/2011 | Shimazawa et al. |
| 8,116,173 | B2 | 2/2012 | Shimazawa et al. |
| 8,134,794 | B1 * | 3/2012 | Wang ..................... G11B 5/314 |
| | | | 369/13.13 |
| 8,194,509 | B2 | 6/2012 | Shimazawa et al. |
| 8,223,596 | B2 | 7/2012 | Chou et al. |
| 8,325,566 | B2 | 12/2012 | Shimazawa et al. |
| 8,391,106 | B2 | 3/2013 | Shimazawa et al. |
| 10,566,013 | B1 * | 2/2020 | Honda ..................... G11B 5/012 |
| 2010/0195239 | A1 | 8/2010 | Takayama |
| 2011/0075527 | A1 * | 3/2011 | Hirata ..................... G11B 7/1387 |
| 2011/0317527 | A1 * | 12/2011 | Wang ..................... G11B 5/127 |
| | | | 369/13.02 |
| 2012/0044790 | A1 | 2/2012 | Shimazawa et al. |
| 2024/0321299 | A1 * | 9/2024 | Aoki ..................... G11B 5/4826 |

FOREIGN PATENT DOCUMENTS

| CN | 102254839 A | 11/2011 |
| CN | 102376313 A | 3/2012 |
| CN | 115472586 A | 12/2022 |

* cited by examiner

*Primary Examiner* — Peter Vincent Agustin (57) ABSTRACT

The disclosure provides a thermally assisted magnetic head comprising a slider and a light source unit provided on the slider. An intermediate connection pad is provided in such a manner that the first light source connection pad and the second light source connection pad of the slider are arranged in a row on a straight line while the intermediate connection pad is not located on the said straight line. The first electrode of the light source unit is electrically connected with the first light source connection pad, and both the second electrode of the light source unit and the second light source connection pad are electrically connected with the intermediate connection pad. Accordingly, a head gimbal assembly and a hard disk drive are further provided in the embodiment of the disclosure.

17 Claims, 7 Drawing Sheets

PRIOR ART

THERMALLY ASSISTED MAGNETIC HEAD, HEAD GIMBAL ASSEMBLY, AND HARD DISK DRIVE

This application is claims priority to CN 202410216890.3 filed Feb. 27, 2024, the entire contents of which is hereby incorporated by reference.

TECHNICAL FIELD

The present disclosure relates to the technical field of hard disk drives, more particularly to a thermally assisted magnetic head, a head gimbal assembly, and a hard disk drive.

BACKGROUND

Figure 1:
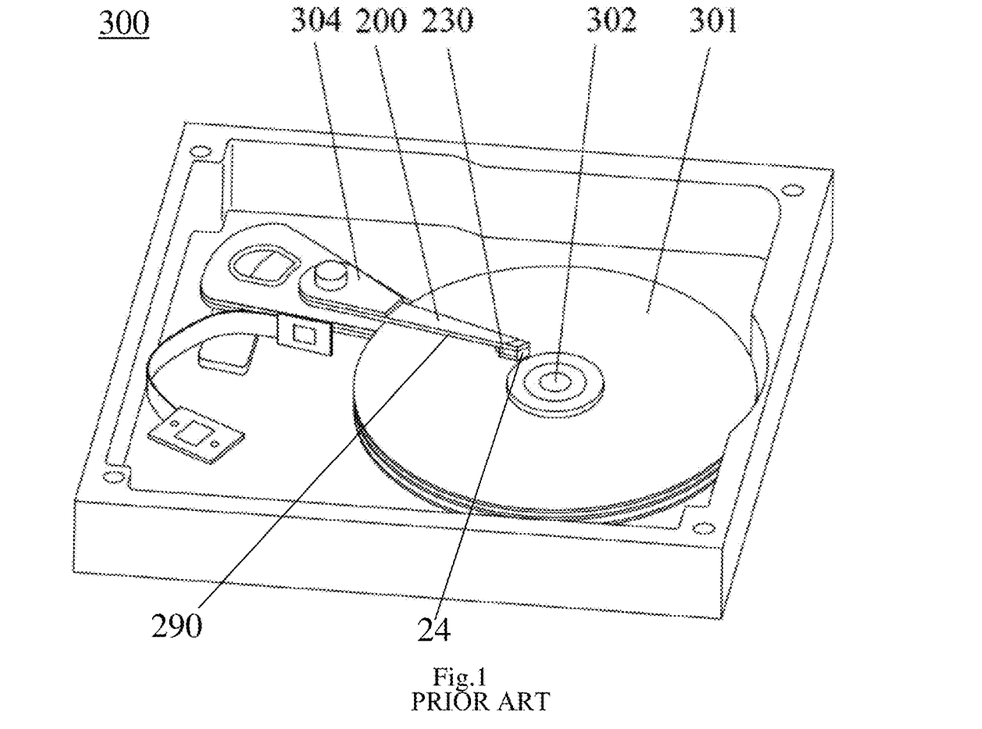
FIG. 1 is a structural schematic view of a hard disk drive in related art.

The hard disk drive (HDD) is used for writing/reading data to/from a disk. As shown in FIG. 1, a hard disk drive 300 generally comprises a plurality of rotatable disks 301 connected to a spindle motor 302, a drive arm 304, and a head gimbal assembly (HGA) 200 mounted at an end of the drive arm 304. Typically, the hard disk drive 300 may further include a voice-coil motor (VCM) to control the movement of the driving arm 304. The head gimbal assembly 200 comprises a magnetic head 230 and a suspension 290 for supporting the magnetic head 230. When the hard disk drive 300 works, the disk 301 is rotated at a high speed by the spindle motor 302, and the magnetic head 230 flies above the disk due to the air pressure generated by the rotation of the disk 301. Under the control of the voice-coil motor, the magnetic head 230 moves in a radial direction on the surface of the disk 301. Concerning different tracks, the magnetic head 230 can read/write data from/to the disk 301.

In the technology of heat assisted magnetic recording (HAMR), the magnetic head comprises a slider and a light source unit (such as a laser diode) arranged on the slider. The light source provides energy to a part of the magnetic recording medium so as to reduce the coercive force thereof. Furthermore, a write magnetic field can be applied to the part that is heated, to facilitate the write operation.

Figure 2:
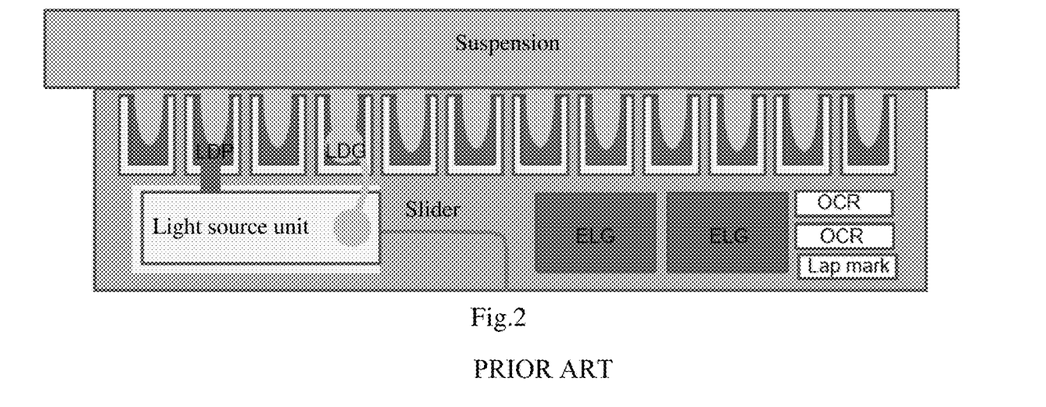
FIG. 2 is a schematic view illustrating a connecting manner between a laser diode and connection pads of a slider in related art.
Figure 3:
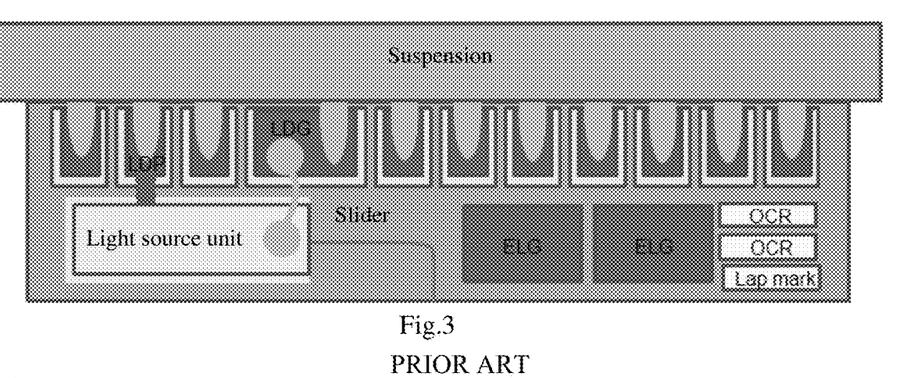
FIG. 3 is a schematic view illustrating a further connecting manner between a laser diode and connection pads of a slider in related art.

Now, the slider is provided with a plurality of connection pads arranged in a row, while the suspension is provided with a plurality of corresponding electrically connecting terminals, so as to allow input of control signals to the magnetic head. Herein, the plurality of connection pads arranged in a row on the slider comprise an LDP pad connected to the P-electrode of the laser diode and an LDG pad connected to the N-electrode of the laser diode. For example, referring to FIG. 2 in related art, when the N-electrode of the laser diode is connected to the LDG pad on the slider, the joint where the N-electrode of the laser diode is bonded to the LDG pad and the joint where the corresponding electrically connecting terminal of the suspension is bonded to the LDG pad may be overlapped, which may result in unstable bonding and thus low yield of the magnetic head. To solve the above-described problems, referring to FIG. 3 in related art, the number of connection pads arranged in the row on the slider is reduced, to leave more space for the LDG pad. Namely, the area of the LDG pad is increased. In such a case, the overlap between the joint where the N-electrode of the laser diode is bonded to the LDG pad and the joint where the corresponding electrically connecting terminal of the suspension is bonded to the LDG pad can be avoided. However, as the plurality of connection pads arranged in the row on the slider provide various functions, such as readers, writers, and HDI sensors, in addition to the controlling of the laser diode, the method in which the number of connection pads arranged in the row on the slider is reduced cannot meet multiple performance requirements for the magnetic head.

SUMMARY

Aiming at the shortcomings of existing technologies, the embodiment of the disclosure provides a thermally assisted magnetic head, which comprises a slider and a light source unit arranged on the slider;

The slider is provided with a first light source connection pad, a second light source connection pad, and an intermediate connection pad, wherein the first light source connection pad and the second light source connection pad are arranged in a row on a straight line while the intermediate connection pad is not located on the said straight line; The light source unit is provided with a first electrode and a second electrode, wherein the first electrode is electrically connected with the first light source connection pad, the second electrode is electrically connected with the intermediate connection pad, and the second light source connection pad is electrically connected with the intermediate connection pad.

Preferably, the intermediate connection pad may be a connection pad exclusively electrically connected with the second electrode and the second light source connection pad.

Preferably, the intermediate connection pad and the light source unit may be arranged in a row.

Preferably, the intermediate connection pad may be an electrical lapping guide connection pad.

Preferably, the second electrode and the intermediate connection pad may be joined by wire connection or solder ball connection.

Preferably, the solder ball connection may be achieved by SBB bridge welding.

Preferably, the slider may be provided with a mounting surface, and all of the first light source connection pad, the second light source connection pad, and the intermediate connection pad are disposed on the mounting surface; the first electrode may be disposed on the first surface of the light source unit, the second electrode may be disposed on the second surface of the light source unit, the first surface is opposite to the second surface and is located at the mounting surface.

Preferably, the light source unit may be a laser diode, the first electrode may be one of the P-electrode of the laser diode and the N-electrode of the laser diode, the first light source connection pad may be the P-electrode connection pad or N-electrode connection pad correspondingly, the second electrode may be the other one of the P-electrode of the laser diode and the N-electrode of the laser diode, and the second light source connection pad may be the P-electrode connection pad or N-electrode connection pad correspondingly.

In order to solve the above-mentioned technical problems, a head gimbal assembly is further provided in the embodiment of the disclosure, which comprises the above-mentioned thermally assisted magnetic head.

In order to solve the above-mentioned technical problems, a hard disk drive is further provided in the embodiment of the disclosure, which comprises the above-mentioned head gimbal assembly.

Compared with existing technologies, the embodiment of the disclosure has advantages as follows. In the embodiment of the disclosure where the thermally assisted magnetic head comprises the slider and the light source unit provided on the slider, the intermediate connection pad is provided in such a manner that the first light source connection pad of the slider and the second light source connection pad of the slider are arranged in a row on the straight line while the intermediate connection pad is not located on the said straight line. As the first electrode of the light source unit is electrically connected with the first light source connection pad, and both the second electrode of the light source unit and the second light source connection pad are electrically connected with the intermediate connection pad. Thus, a reliable electrical connection between the second electrode of the light source unit and the second light source connection pad can be ensured. In this way, it avoids the low yield caused by the overlap of the joint where the second electrode of the light source unit is bonded to the second light source connection pad and the joint where the suspension is bonded to the second light source connection pad in practice, without the need to reduce original quantity of connection pads. Accordingly, in the embodiment of the disclosure, a head gimbal assembly and a hard disk drive are further provided.

Herein, 300. hard disk drive; 302. spindle motor; 301. disk; 304. drive arm; 200. head gimbal assembly; 230. magnetic head; 290. suspension; 1. thermally assisted magnetic head; 2. slider; 21. first light source connection pad; 22. second light source connection pad; 23. intermediate connection pad; 24. mounting surface; 25. leading surface; 26. air bearing surface; 3. light source unit; 31. first electrode; 32. second electrode; 4. suspension; 5. waveguide; 6. surface plasmon antenna; 10. slider; 20. laser diode; 30. base; 40. surface plasmon antenna; 50. waveguide.

DETAILED DESCRIPTION OF ILLUSTRATED EMBODIMENTS

The technical solutions according to the embodiments of the present disclosure will be clearly and completely explained below in conjunction with the drawings for the embodiments. Apparently, the described embodiments are merely a part rather than all of the embodiments of the present disclosure. All embodiments obtained by those skilled in the art based on the embodiments of the present disclosure without creative work shall fall within the scope of the present disclosure.

As shown in the structural schematic views of a thermally assisted magnetic head 1 according to an embodiment of the disclosure in FIGS. 4-7, a thermally assisted magnetic head 1 according to the embodiment of the disclosure comprises a slider 2 and a light source unit 3 provided on the slider 2;

The slider 2 is provided with a first light source connection pad 21, a second light source connection pad 22, and an intermediate connection pad 23, wherein the first light source connection pad 21 and the second light source connection pad 22 are arranged in a row on a straight line while the intermediate connection pad 23 is not located on the said straight line; The light source unit 3 is provided with a first electrode 31 and a second electrode 32, wherein the first electrode 31 is electrically connected with the first light source connection pad 21, the second electrode 32 is electrically connected with the intermediate connection pad 23, and the second light source connection pad 22 is electrically connected with the intermediate connection pad 23.

In the embodiment of the disclosure where the thermally assisted magnetic head 1 comprises the slider 2 and the light source unit 3 provided on the slider 2, the intermediate connection pad 23 is provided in such a manner that the first light source connection pad 21 of the slider 2 and the second light source connection pad 22 of the slider 2 are arranged in a row on the straight line while the intermediate connection pad 23 is not located on the said straight line. As the first electrode 31 of the light source unit 3 is electrically connected with the first light source connection pad 21, and both the second electrode 32 of the light source unit 3 and the second light source connection pad 22 are electrically connected with the intermediate connection pad 23. Thus, a reliable electrical connection between the second electrode 32 of the light source unit 3 and the second light source connection pad 22 can be ensured. In this way, it avoids the low yield caused by the overlap of the joint where the second electrode 32 of the light source unit 3 is bonded to the second light source connection pad 22 and the joint where the suspension 4 is bonded to the second light source connection pad 22 in practice, without the need to reduce original quantity of connection pads.

Figure 4:
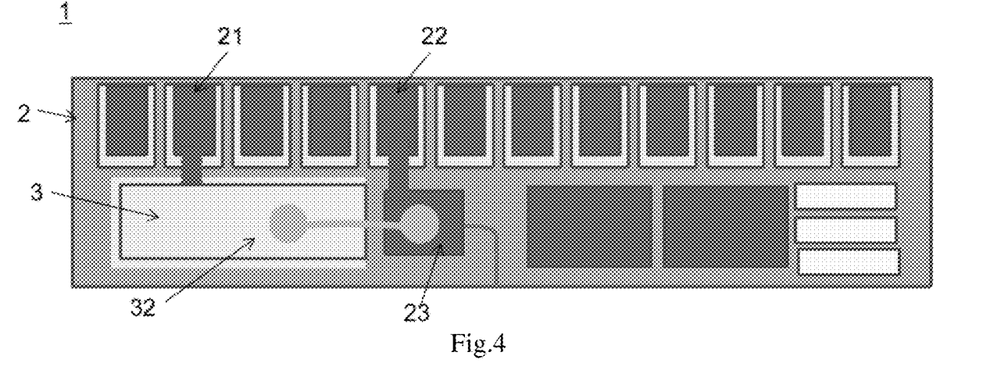
FIG. 4 is a structural schematic view of a thermally assisted magnetic head according to an embodiment of the disclosure.
Figure 5:
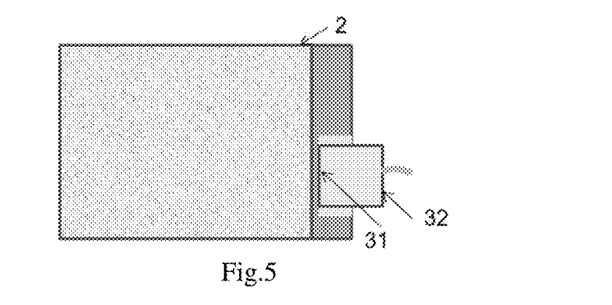
FIG. 5 is a left view corresponding to FIG. 4.
Figure 8:
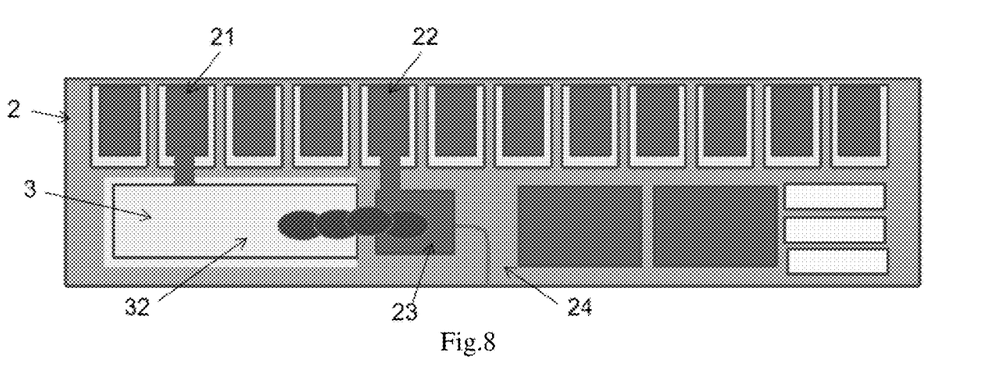
FIG. 8 is a schematic view illustrating that a second electrode of a light source unit is welded to an intermediate connection pad via SBB bridge welding.
Figure 12:
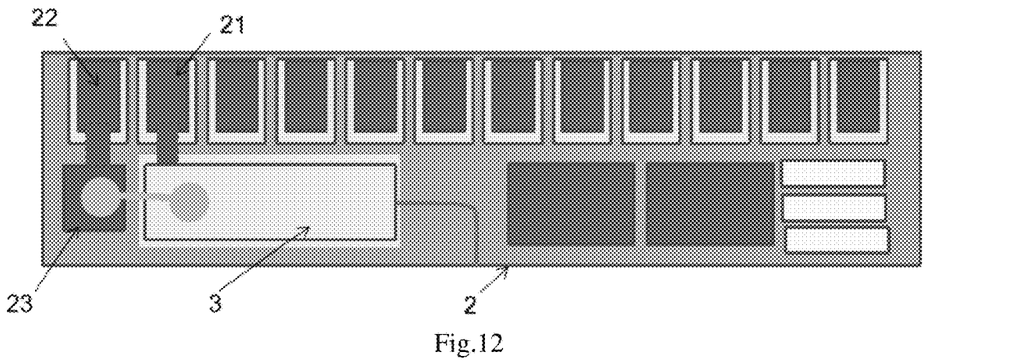
FIG. 12 is a schematic view illustrating that an intermediate connection pad is located on a left side of a light source unit according to an embodiment of the disclosure.

Referring to FIGS. 4, 8, and 12, in an optional example, the intermediate connection pad 23 is exclusively electrically connected with the second electrode 32 and the second light source connection pad 22. In the present embodiment, by providing an intermediate connection pad 23 which is connected with both the second electrode 32 of the light source unit 3 and the second light source connection pad 22, in addition to providing preexisting connection pads, it can avoid the low yield problem caused by the overlap of the joint where the second electrode 32 of the light source unit 3 is bonded to the second light source connection pad 22 and the joint where the suspension 4 is bonded to the second light source connection pad 22 in practice, on the premise of ensuring a reliable electrical connection between the second electrode 32 of the light source unit 3 and the second light source connection pad 22, without the need to reduce the quantity of preexisting connection pads.

Referring to FIGS. 4, 6, 8, 10, 12 and 14, in a particular implementation, the electrical connection between the intermediate connection pad 23 and the second light source connection pad 22 can be achieved for example through printed circuits or the like, and the electrical connection between the first electrode 31 of the light source unit 3 and the first light source connection pad 21 can be achieved for example through printed circuits or the like.

Figure 6:
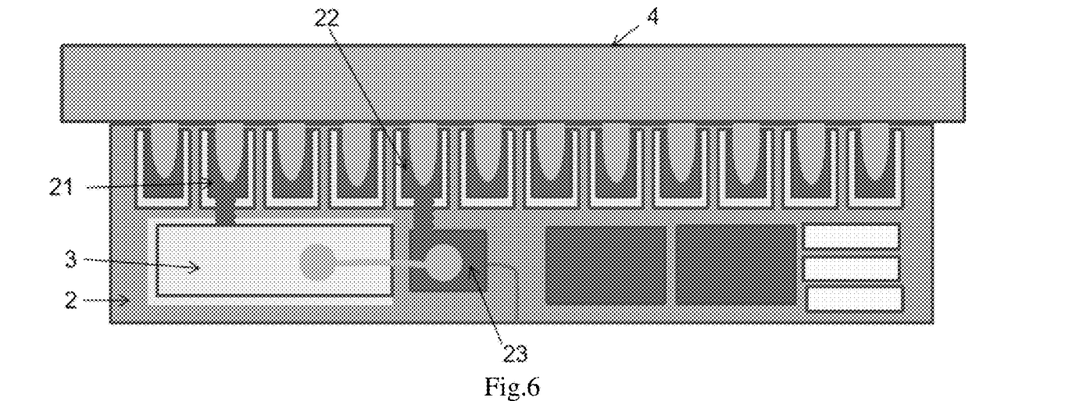
FIG. 6 is a schematic view illustrating an assembling of a thermally assisted magnetic head and a suspension according to an embodiment of the disclosure.
Figure 7:
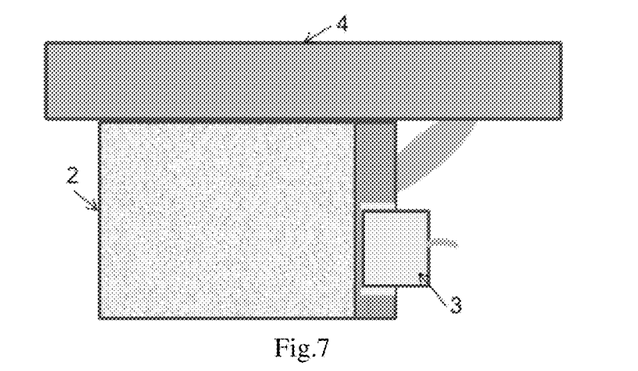
FIG. 7 is a left view corresponding to FIG. 6.
Figure 13:
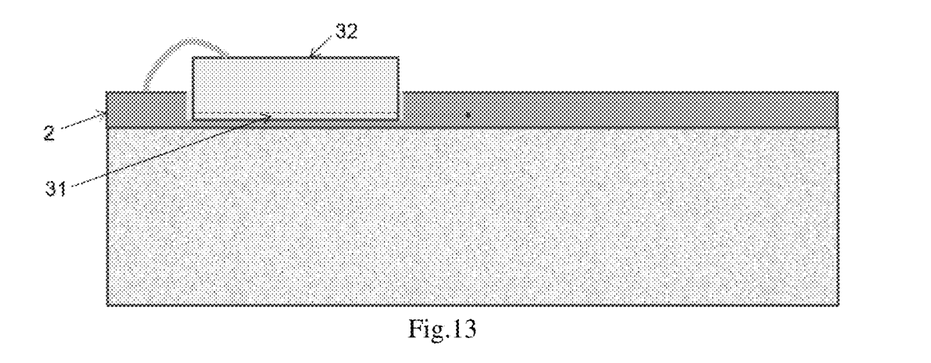
FIG. 13 is a bottom view corresponding to FIG. 12.

Referring to FIGS. 6, 7, 12 and 13, the intermediate connection pad 23 and the light source unit 3 are arranged in a row. Illustratively, the intermediate connection pad 23 for example may be provided on the left side of the light source unit 3 as shown in FIGS. 12 and 13, or alternatively may be provided on the right side of the light source unit 3 as shown in FIGS. 6 and 7, to facilitate the connection between the second electrode 32 of the light source unit 3 and the intermediate connection pad 23. Consequently, it can improve convenience in actual operation and meanwhile utilize the space of the slider 2 more efficiently.

Figure 14:
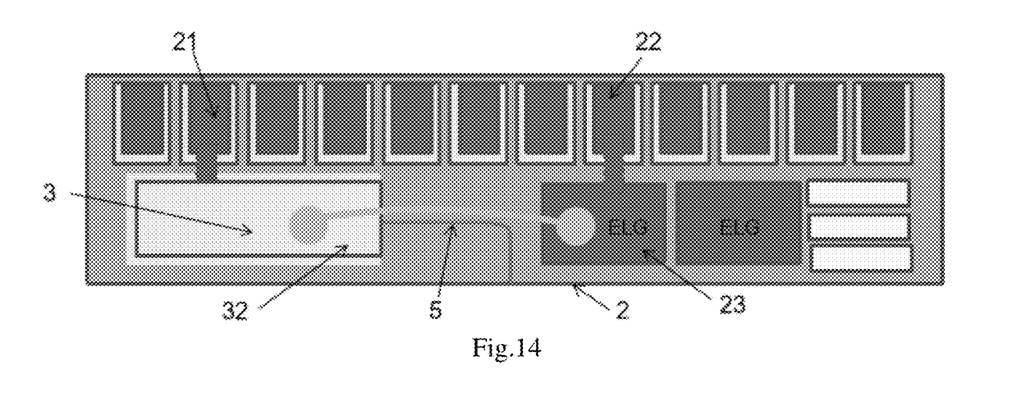
FIG. 14 is a structural schematic view of a thermally assisted magnetic head according to an embodiment of the disclosure, where an intermediate connection pad is an electrical lapping guide connection pad.
Figures 15, 16:
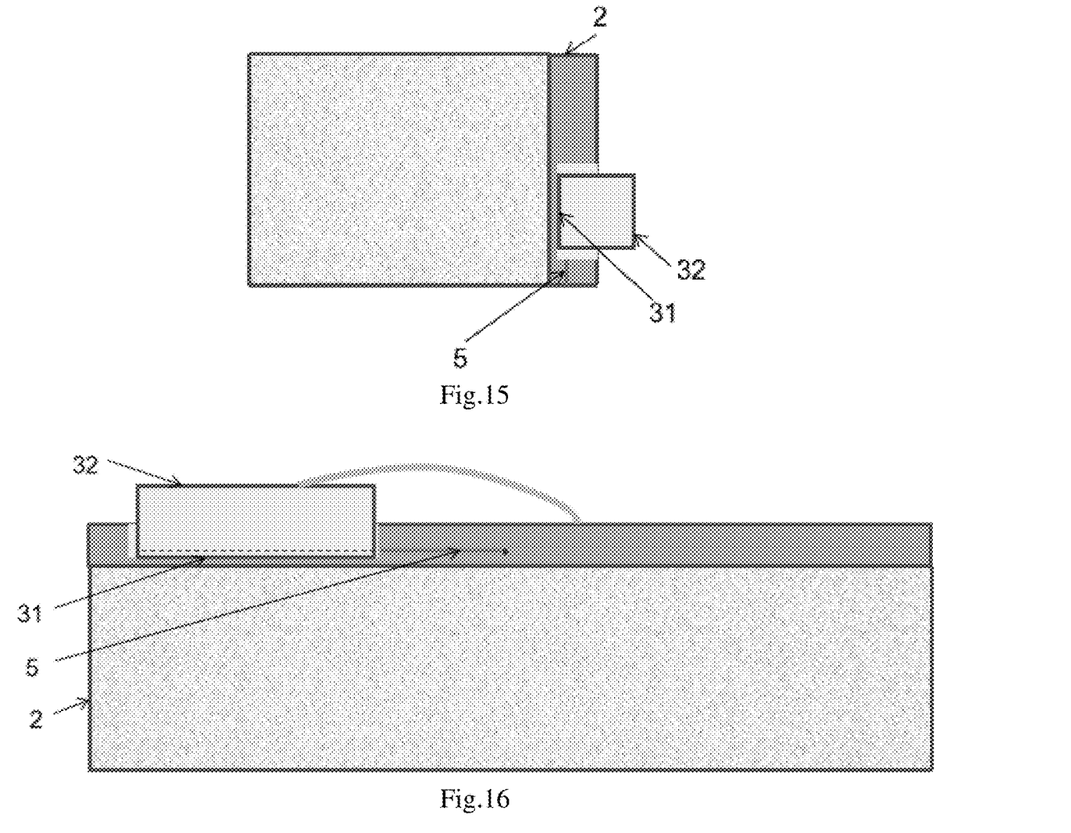
FIG. 15 is a left view corresponding to FIG. 14.
FIG. 16 is a bottom view corresponding to FIG. 14.

Referring to FIGS. 14-16, in a further optional example, the intermediate connection pad 23 may be the electrical lapping guide connection pad. It should be noted that the electrical lapping guide (ELG) connection pad is mainly applied to the lapping process for the slider 2. When the thermally assisted magnetic head 1 is actually used, the ELG connection pad is not electrically connected with any other element. Thus, the electrical lapping guide connection pad can be used as the intermediate connection pad 23 without affecting any other function of the thermally assisted magnetic head 1.

Referring to FIG. 4, in an optional example, the second electrode 32 may be joined with the intermediate connection pad 23 through a wire. Apparently, the second electrode 32 and the intermediate connection pad 23 may be connected by solder ball bonding (SBB) as shown in FIG. 8. In the present embodiment, the wire connection or the solder ball connection can ensure a reliable connection between the second electrode 32 of the light source unit 3 and the intermediate connection pad 23.

Referring to FIGS. 8-11, in an optional example, the solder ball connection may be achieved by SBB bridge welding. In the present embodiment, as the electrical connection between the second electrode 32 of the light source unit 3 and the intermediate connection pad 23 is achieved by SBB bridge welding, the reliability of the connection between the second electrode 32 of the light source unit 3 and the intermediate connection pad 23 can be further ensured.

Figure 9:
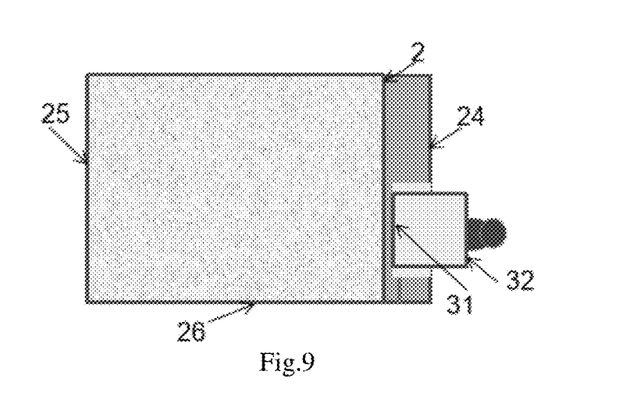
FIG. 9 is a left view corresponding to FIG. 8.
Figure 10:
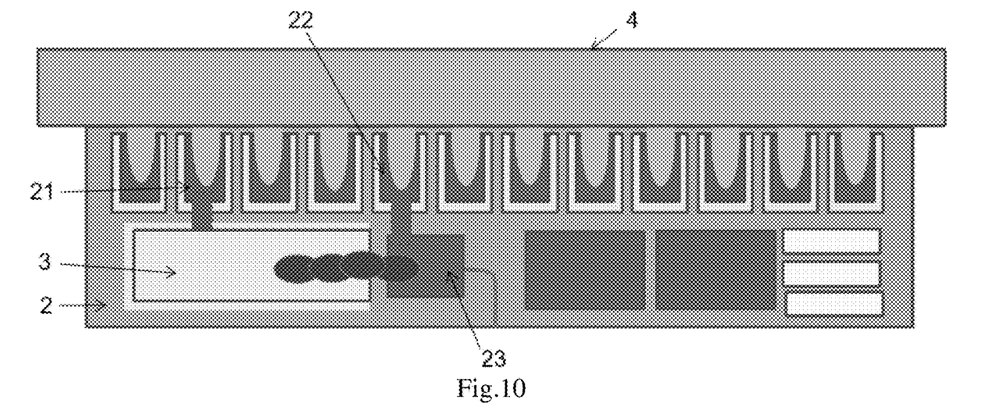
FIG. 10 is a schematic view illustrating an assembling of a thermally assisted magnetic head and a suspension according to an embodiment of the disclosure.
Figure 11:
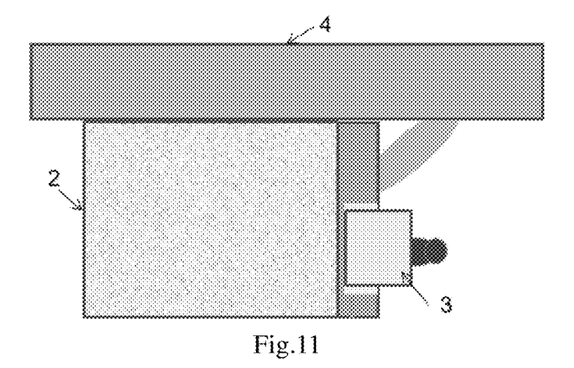
FIG. 11 is a left view corresponding to FIG. 10.

Referring to FIGS. 8 and 9, in an optional example, the slider 2 may be provided with a mounting surface 24, and all of the first light source connection pad 21, the second light source connection pad 22 and the intermediate connection pad 23 may be disposed on the mounting surface 24; wherein the first electrode 31 may be disposed on the first surface of the light source unit 3, the second electrode 32 may be disposed on the second surface of the light source unit 3, the first surface is opposite to the second surface and is located at the mounting surface 24.

In the present embodiment, all of the first light source connection pad 21, the second light source connection pad 22, the intermediate connection pad 23, and the light source unit 3 may be arranged on a same surface of the slider 2, thereby facilitating more compact layout.

Figure 17:
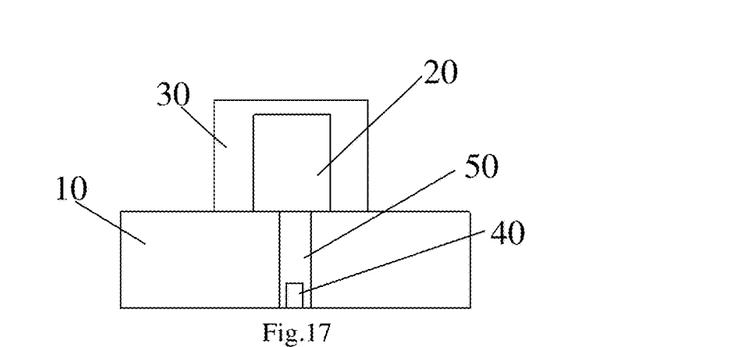
FIG. 17 is a structural schematic view of an LOS structure in related art.

In an optional example, the light source unit 3 may be a laser diode. Referring to FIG. 17, the LOS (LD On Slider) structure is one of the conventional HAMR structures (i.e., the structures where the laser diode 20 is disposed on the slider 10), which involves three elements, i.e., the laser diode 20, the base 30 and the slider 10. Herein, the laser diode 20 is connected to the base 30. Such structure is referred to as LDU. The LDU is optically aligned and is connected to the back surface of the slider 10. Usually, such assembly is referred to as the L-slider (L-SLD). However, the HAMR structure in the present embodiment is LIT (LD In Trailing surface) structure, that is, the structure where the laser diode is arranged in the trailing surface of the slider 2. In particular, in the LIT structure, the trailing surface of the slider 2 may be provided with a cavity, in which the laser diode is placed. Such design which combines the laser diode in the cavity does not need a specialized laser diode base or even further a connection device thereof, and thus it can reduce material cost and process cost. Furthermore, the LIT structure can contribute to the multi-stack HDD. Referring to FIG. 1, the mounting surface 24 in the present embodiment is the trailing surface of the slider 2. Besides, the slider 2 has a leading surface 25 and an air bearing surface (ABS) 26, and the leading surface 25 is opposite to the trailing surface, as shown in FIG. 9.

Figure 18:
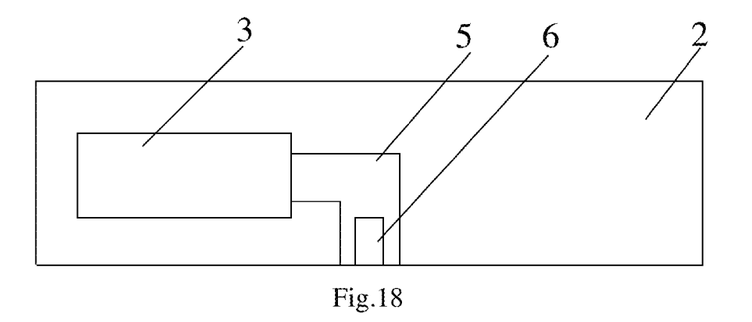
FIG. 18 is a schematic view of an LIT structure according to an embodiment of the disclosure.

Referring to FIGS. 9 and 18, in practical application, the air bearing surface 26 of the slider 2 may face the magnetic recording medium, the laser emitted from the laser diode can be transmitted by the waveguide 5 and transduced into the near-field light by the surface plasmon antenna 6, so as to heat the magnetic recording medium and reduce the coercive force of the magnetic recording medium to facilitate data writing on the magnetic recording medium by the magnetic head.

In a particular implementation, the first electrode 31 may be one of the P-electrode of the laser diode and the N-electrode of the laser diode, the first light source connection pad 21 may be the corresponding P-electrode connection pad or N-electrode connection pad, the second electrode 32 may be the other one of the P-electrode of the laser diode and the N-electrode of the laser diode, and the second light source connection pad 22 may be the corresponding P-electrode connection pad or N-electrode connection pad.

Illustratively, in the case that the first electrode 31 is the P-electrode of the laser diode, the first light source connection pad 21 correspondingly is the P-electrode connection pad, the second electrode 32 the N-electrode of the laser diode, and the second light source connection pad 22 correspondingly is the N-electrode connection pad; in the case that the first electrode 31 is the N-electrode of the laser diode, the first light source connection pad 21 correspondingly is the N-electrode connection pad, the second electrode 32 is the P-electrode of the laser diode, and the second light source connection pad 22 correspondingly is the P-electrode connection pad.

It should be noted that, in a particular implementation as shown in FIGS. 14-16, the slider 2 may be further provided with a waveguide 5, the light emitted from the light source unit 3 may be transmitted by waveguide 5. More detailed descriptions can be referred to relevant technologies and thus are not repeated herein.

Accordingly, a head gimbal assembly 200 is further provided in an embodiment of the disclosure. Referring to FIG. 1, the head gimbal assembly 200 comprises the thermally assisted magnetic head according to any one of the above described embodiment. In a particular implementation, the head gimbal assembly may further comprise a suspension 290 for supporting the magnetic head. The suspension 290 may be provided with a plurality of electrical connecting terminals, and the slider 2 may be provided with a plurality of connection pads for electrically connecting with the plurality of electrical connecting terminals of the suspension. In this way, control signals can be transmitted by the control circuit through the electrical connecting terminals of the suspension and the connection pads of the slider 2.

Accordingly, referring to FIG. 1, a hard disk drive 300 is further provided in an embodiment of the disclosure, which comprises the head gimbal assembly 200. In a particular implementation, the hard disk drive 300 may further comprise a plurality of rotatable disks 301 connected with the spindle motor 302 and a drive arm 304, and the head gimbal assembly 200 is mounted at an end of the drive arm 304. Generally, the hard disk drive 300 further comprises a voice-coil motor for control the movement of the drive arm 304. When the hard disk drive 300 works, the disks 301 are rotated at a high speed by the spindle motor 302, and the magnetic head 230 flies above the disks due to the air pressure generated by the rotation of the disks 301. Under the control of the voice-coil motor, the magnetic head 230 moves in a radial direction on the surface of the disks 301. Concerning different tracks, the magnetic head 230 can read/write data from/to the disks 301.

Compared with existing technologies, the embodiment of the disclosure has advantages as follows. In the embodiment of the disclosure where the thermally assisted magnetic head 1 comprises the slider 2 and the light source unit 3 provided on the slider 2, the intermediate connection pad 23 is provided in such a manner that the first light source connection pad 21 of the slider 2 and the second light source connection pad 22 of the slider 2 are arranged in a row on the straight line while the intermediate connection pad 23 is not located on the said straight line. As the first electrode 31 of the light source unit 3 is electrically connected with the first light source connection pad 21, and both the second electrode 32 of the light source unit 3 and the second light source connection pad 22 are electrically connected with the intermediate connection pad 23. Thus, a reliable electrical connection between the second electrode 32 of the light source unit 3 and the second light source connection pad 22 can be ensured. In this way, it avoids the low yield especially on SBB welding, caused by the overlap of the joint where the second electrode 32 of the light source unit 3 is bonded to the second light source connection pad 22 and the joint where the suspension 4 is bonded to the second light source connection pad 22 in practice, without the need to reduce original quantity of connection pads. Accordingly, in the embodiment of the disclosure, a head gimbal assembly 200 and a hard disk drive 300 are further provided.

All the above are merely preferred embodiments of the present disclosure. It should be noted that those skilled in the art may obtain modifications and equivalents without departing from the technical principle of the present disclosure. The invention is intended to cover all modifications and equivalents included within the scope of the present disclosure.

The invention claimed is:

1. A thermally assisted magnetic head, comprising a slider and a light source unit arranged on the slider;
wherein the slider is provided with a first light source connection pad, a second light source connection pad, and an intermediate connection pad, wherein the first light source connection pad and the second light source connection pad are arranged in a row on a straight line while the intermediate connection pad is not located on said straight line; the light source unit is provided with a first electrode and a second electrode, wherein the first electrode is electrically connected with the first light source connection pad, the second electrode is electrically connected with the intermediate connection pad, and the second light source connection pad is electrically connected with the intermediate connection pad.

2. The thermally assisted magnetic head according to claim 1, wherein the intermediate connection pad is a connection pad exclusively electrically connected with the second electrode and the second light source connection pad.

3. The thermally assisted magnetic head according to claim 2, wherein the intermediate connection pad and the light source unit are arranged in a row.

4. The thermally assisted magnetic head according to claim 1, wherein the intermediate connection pad is an electrical lapping guide connection pad.

5. The thermally assisted magnetic head according to claim 1, wherein the second electrode and the intermediate connection pad are joined by wire connection or solder ball connection.

6. The thermally assisted magnetic head according to claim 5, wherein the solder ball connection is achieved by SBB bridge welding.

7. The thermally assisted magnetic head according to claim 1, wherein the slider is provided with a mounting surface, and all of the first light source connection pad, the second light source connection pad, and the intermediate connection pad are disposed on the mounting surface; the first electrode is disposed on a first surface of the light source unit, the second electrode is disposed on a second surface of the light source unit, the first surface is opposite to the second surface, and the first surface is located at the mounting surface.

8. The thermally assisted magnetic head according to claim 1, wherein the light source unit is a laser diode, the first electrode is one of a P-electrode of the laser diode and an N-electrode of the laser diode, the first light source connection pad is a P-electrode connection pad or N-electrode connection pad correspondingly, the second electrode is the other one of the P-electrode of the laser diode and the N-electrode of the laser diode, and the second light source connection pad is the P-electrode connection pad or N-electrode connection pad correspondingly.

9. A head gimbal assembly, comprising the thermally assisted magnetic head according to claim 1.

10. A hard disk drive, comprising the head gimbal assembly according to claim 9.

11. A hard disk drive, comprising the thermally assisted magnetic head according to claim 2.

12. A hard disk drive, comprising the thermally assisted magnetic head according to claim 3.

13. A hard disk drive, comprising the thermally assisted magnetic head according to claim 4.

14. A hard disk drive, comprising the thermally assisted magnetic head according to claim 5.

15. A hard disk drive, comprising the thermally assisted magnetic head according to claim 6.

16. A hard disk drive, comprising the thermally assisted magnetic head according to claim 7.

17. A hard disk drive, comprising the thermally assisted magnetic head according to claim 8.

* * * * *